April 24, 1934.  R. H. CARSON  1,956,004
CONTROLLER
Filed March 6, 1930   6 Sheets-Sheet 1

Fig. 1

Witness:
William P. Kilroy

Inventor:
Robert H. Carson
By Hill & Hill
Attys

April 24, 1934.  R. H. CARSON  1,956,004
CONTROLLER
Filed March 6, 1930   6 Sheets-Sheet 2

Witness:
William P. Kilroy

Inventor:
Robert H. Carson
Hill & Hill

April 24, 1934.   R. H. CARSON   1,956,004
CONTROLLER
Filed March 6, 1930   6 Sheets-Sheet 3

Fig.4

Witness:
William P. Kilroy

Inventor:
Robert H. Carson
By Hill & Hill
Attys

April 24, 1934.　　　R. H. CARSON　　　1,956,004
CONTROLLER
Filed March 6, 1930　　6 Sheets-Sheet 4

Fig. 5.

Witness:
William P. Kilroy

Inventor
Robert H. Carson
By Hill & Hill
Attys

April 24, 1934.  R. H. CARSON  1,956,004
CONTROLLER
Filed March 6, 1930  6 Sheets-Sheet 5

Fig.6.

Witness:
William P. Kilroy

Inventor
Robert H. Carson
By Hill & Hill
Attys.

April 24, 1934.    R. H. CARSON    1,956,004
CONTROLLER
Filed March 6, 1930    6 Sheets-Sheet 6

Witness:
William P. Kilroy

Inventor:
Robert H. Carson
By Hill & Hill
Attys.

Patented Apr. 24, 1934

1,956,004

UNITED STATES PATENT OFFICE 1,956,004

CONTROLLER

Robert H. Carson, Chicago, Ill., assignor, by mesne assignments, to Jas. P. Marsh Corporation, Chicago, Ill., a corporation of Illinois Application March 6, 1930, Serial No. 433,838

14 Claims. (Cl. 137—78)

The invention relates to a mechanism for controlling and maintaining a predetermined condition between the supply and return mains of a heating system.

The prime object of the invention is to provide a governor which will preserve a pressure differential in the return and supply main of the system and a lower pressure in the return than in the supply.

It is also an object of the invention to construct a device whereby the above and other objects may be accomplished having means whereby the device may be set to operate at various pressures above or below and at atmospheric pressure.

In addition to the above, it is an object to provide a construction capable of operation to effect the above which includes a pressure operable valve for controlling the pressure obtaining in the system preferably in the supply side of the system.

Another object of the invention is to provide an electric switch in circuit with a pump circuit for controlling the operation of a vacuum pump, the switch being operable by pressure responsive means which is operable when a pressure above or below a prescribed pressure occurs in the system, to automatically actuate the switch and thus control the operation of the pump.

A further object of the invention is to accomplish the above and other objects through the medium of pressure responsive diaphragms.

It is another object of the invention to employ pressure responsive means, each of which is responsive to a different pressure, which may have combined therewith means for varying the pressure required to operate the pressure responsive means.

The invention has as an additional object the utilization of diaphragms and the combination therewith of means for varying the pressure required for actuating said diaphragms.

The invention has these and other objects, all of which will be described and more readily understood when read in conjunction with the accompanying drawings which illustrate various embodiments of which the invention is susceptible, it being, therefore, obvious that other changes and modifications may be resorted to without departing from the spirit of the appended claims forming a part hereof.

Figure 3:
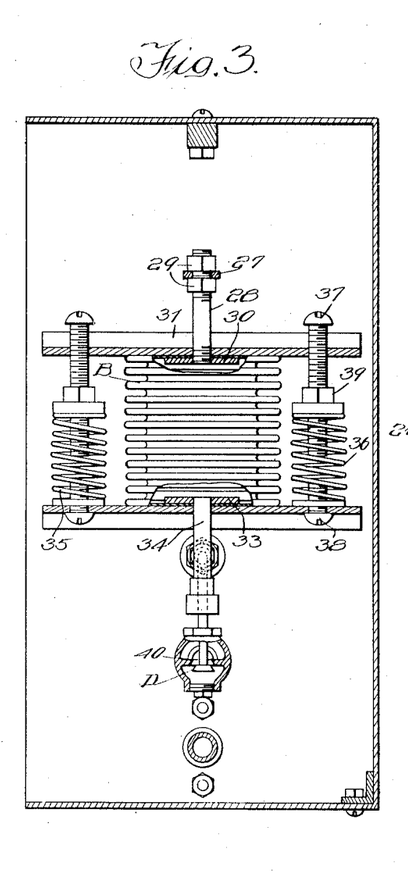
Fig. 3 is a section taken along line 3—3 of Fig. 1.
Figure 4:
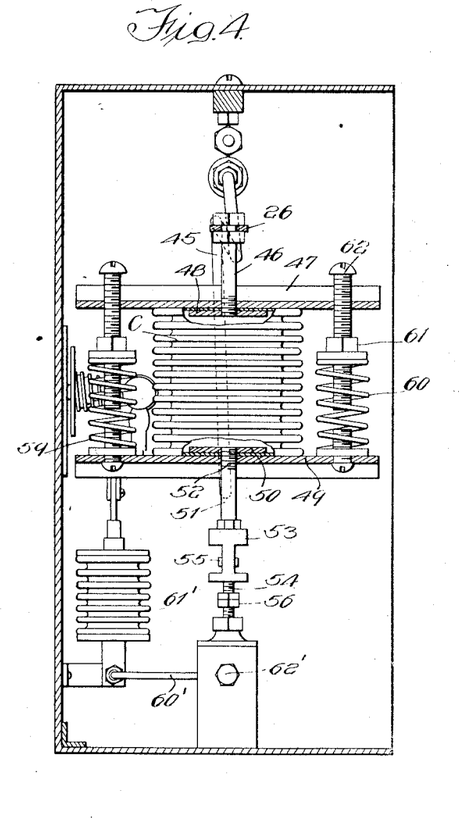
Fig. 4 is a section taken on the line 4—4 of Fig. 1.
Figure 5:
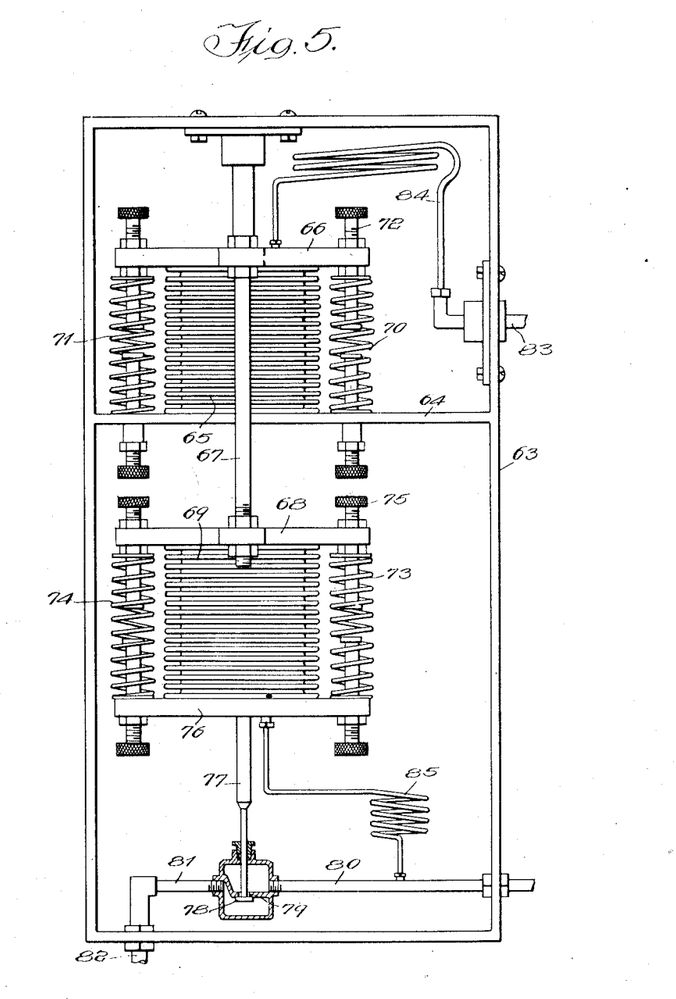
Figs. 5 and 6 are elevational views, certain portions being shown in section for the purpose of illustration and illustrate a modified structure which may be resorted to to accomplish the various features.
Figure 6:
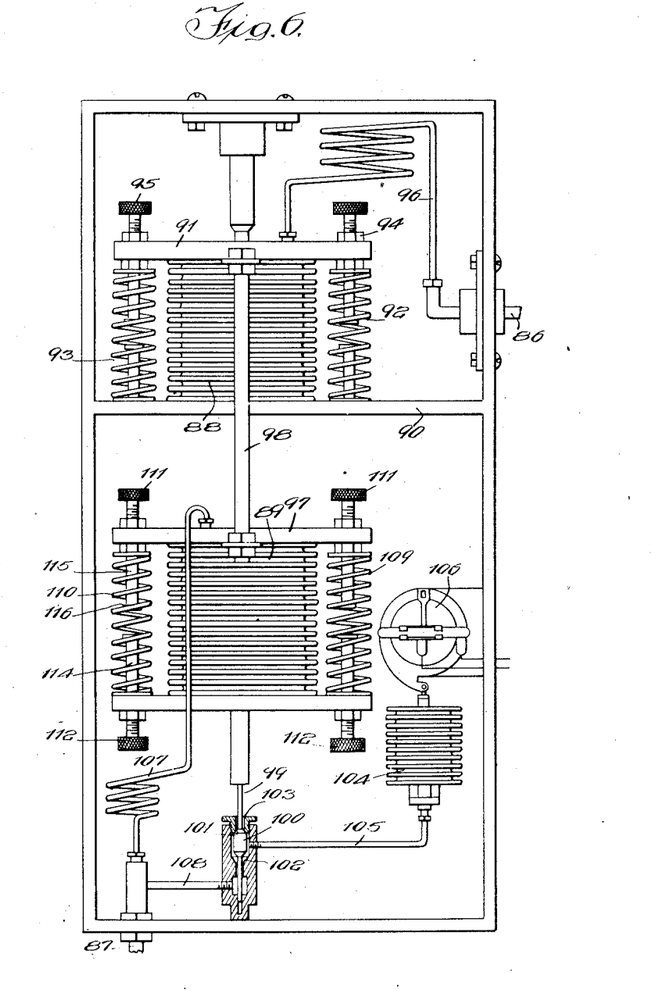
Figure 7:
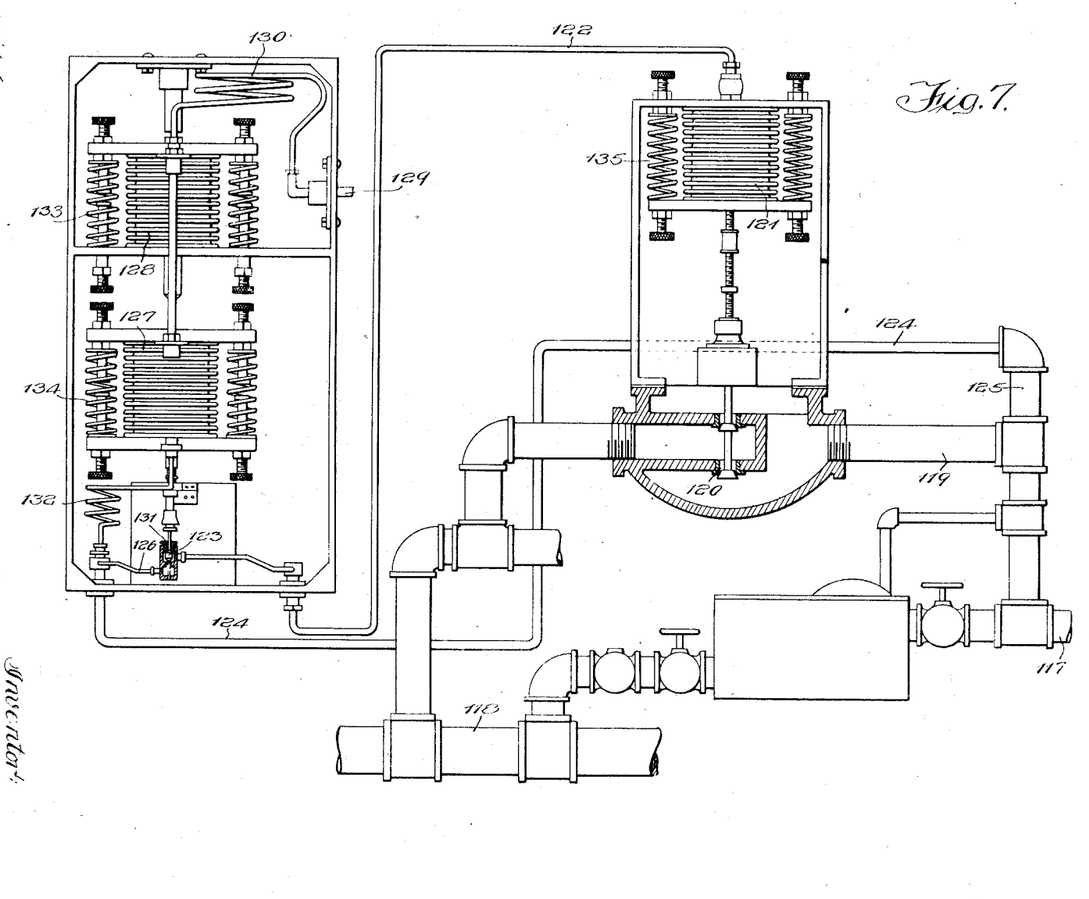
Fig. 7 is a view showing another construction which may be employed.

The structure shown in Figs. 1 to 4 and the structures illustrated in Figs. 5 to 7, inclusive, are respectively continuations in part of my applications respectively filed August 16, 1928, Serial No. 299,963, and my application filed February 7, 1930, Serial No. 426,579.

Figure 1:
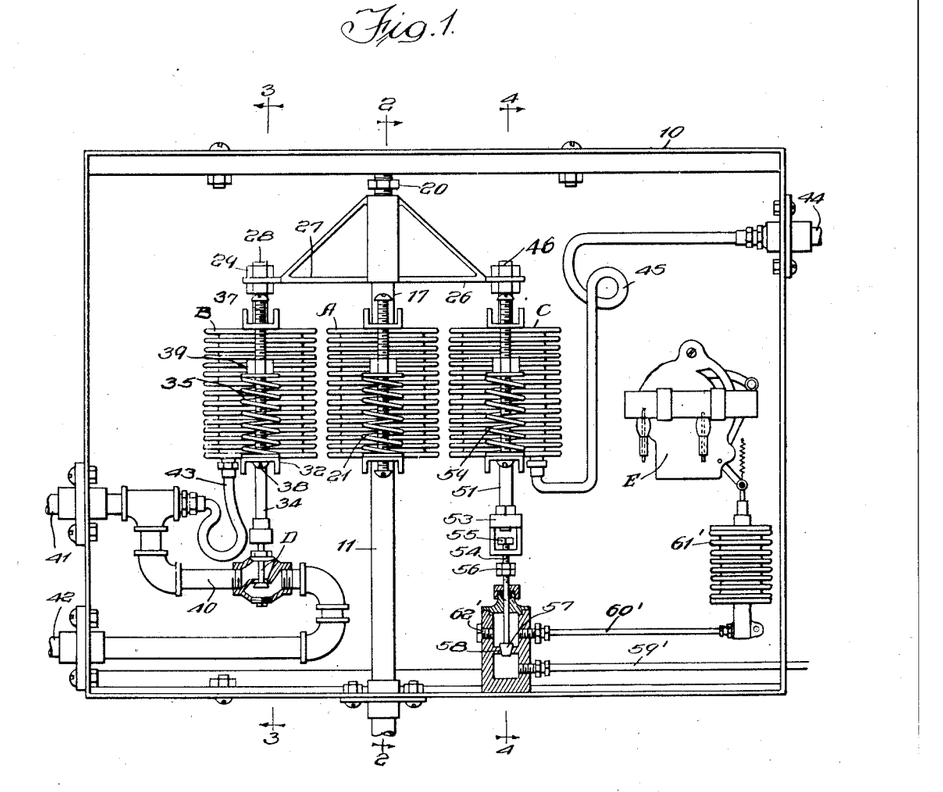
Fig. 1 is a front elevation of one construction whereby the above enumerated advantages may be accomplished.

By referring to Fig. 1 of the first mentioned application, the manner of use of the device in a heating system is illustrated. The system disclosed in both of said applications is designed to operate with a pressure differential respectively in the supply and return sides of the system with a lower pressure provided in the return.

The structure illustrated in Fig. 1 contemplates the provision of a plurality of pressure responsive elements or diaphragms respectively designated A, B and C. The diaphragm B is provided to control the operation of a valve D, the diaphragm C being designed to control the actuation of an electric switch E which switch is connected in circuit with a vacuum pump (not shown) for producing a reduced pressure condition in the system.

The structure is preferably located within a box-like housing 10 which has a pipe connection 11 extended therethrough; this pipe connection has one end thereof connected for communication with the interior of the diaphragm A. The opposite end of this pipe connection generally designated 11 is connected with the supply side of the system, it being understood that the vacuum pump is provided to produce a reduced air condition in both the supply and return side of the system and, therefore, when the pump is actuated, the reduced air condition existing in the system and particularly the supply side thereof will also exist in the pipe connection 11 and the diaphragm A.

Figure 2:
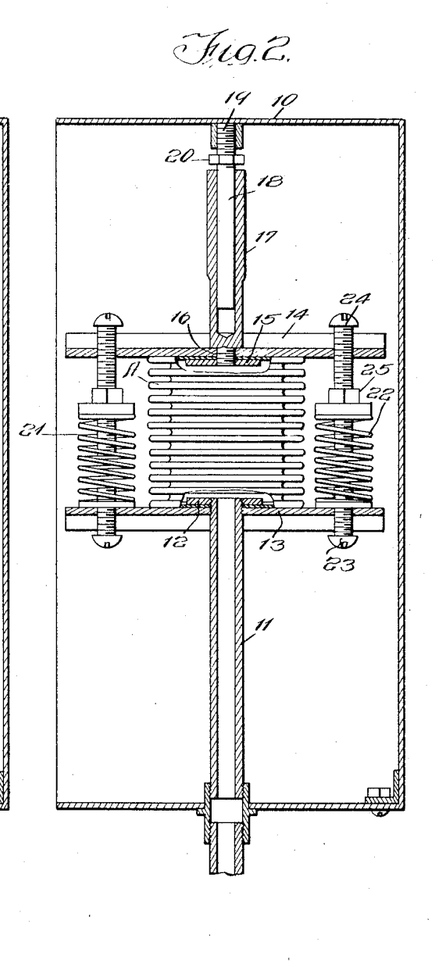
Fig. 2 is a section taken on the line 2—2 of Fig. 1.

By referring to Fig. 2, it will be noted that one end of the diaphragm A is held stationary, it being connected to the stationary pipe 11 through the agency of a nut 12 which is screw-threaded upon the adjacent end of the pipe 11 and provides means for clamping this end of the diaphragm A between the nut 12 and the cross piece or support 13 to thereby hold this end of the diaphragm against movement when a pressure occurs within the diaphragm A. The opposite end of the diaphragm A is secured to a cross piece 14 through the medium of a nut 15 which is connected with the threaded extension 16 of the tubular element 17. The tubular element 17 is shouldered adjacent the threaded portion 16 so that the cross piece 14 may, through the medium of the nut 15, be held with respect to the tubular element 17. A guide rod 18 providing a guide post for the tubular element 17 is located within the bore of the element and said guide post 18 is rigidly secured by the threads 19 with a wall of the casing designated 10. An adjustment nut 20 is provided for adjustment along the threaded portion 19 of the post 18 and said nut 20 is provided to produce an adjustable stop with which the tubular element 17 may cooperate to limit movement thereof and the diaphragm A toward the adjustable stop.

Expansion springs 21 and 22 are arranged adjacent the opposite ends of the cross pieces or supports 13 and 14, and said springs are respectively held with relation to the cross pieces through the agency of the adjustment screws 23 and 24. An adjusting nut 25 is mounted for adjustment along the adjusting screw 24 and, therefore, it is manifest that the expansion springs 21 and 22 may be subjected to various degrees of compression and thus provide means for varying the amount or degree of reduced pressure required to cause the actuation of the diaphragm A. From this it can be seen that when a reduced pressure occurs in the pipe connection 11 and the diaphragm A, sufficient to collapse said diaphragm against the resistance of the expansion springs 21 and 22, that this movement of the diaphragm is imparted to the tubular element 17.

By referring to Fig. 1, it will be seen that the tubular element 17 is provided with the lateral oppositely extending arms respectively designated 26 and 27. These arms 26 and 27 provide means for respectively suspending the diaphragms B and C. The diaphragm B is connected with the arm 27 through the medium of a rod 28, the rod being connected with its arm 27 by means of nuts 29.

By referring to Fig. 3, it will be noted that one end of the rod 28 is screw-threaded to receive a nut 30 which provides means for supporting the cross piece 31, the adjacent end of the diaphragm B being clamped between the nut and the cross piece. The opposite end of the diaphragm B is clamped between a cross piece 32 and a nut 33 which are connected with one end of a valve rod 34 having the stem of the valve D connected therewith.

The structure illustrated in Fig. 3 also contemplates the utilization of expansion springs 35 and 36 which extend between the cross pieces 31 and 32 and are held with relation thereto through the agency of the adjusting screws such as that designated 37 and the screws 38. An adjusting nut such as 39 is mounted upon each of the screws 37 to provide means for variably adjusting the tension of the springs 35 and 36.

The valve D is located in a pipe connection 40 which provides a connection between a pipe 41 and a pipe 42, the former being connected with the supply side of the heating system and the latter to the return side and the pump for creating and maintaining a reduced air condition in the supply and return. A flexible tube 43 connects the diaphragm B with the pipe connection 40 and this flexible tube provides a communication between the supply pipe 41 and the diaphragm B. It is manifest that when the pump (not shown) is operated, a reduced air condition is produced in the supply and return sides of the system and since the pipe connection 11 is connected with the supply side of the system, an air condition below atmospheric pressure is created in the diaphragm A. When the reduced air condition is sufficient to overcome the resistance of the springs 21 and 22, of the diaphragm A, the diaphragm A will collapse, causing downward movement of the tubular element 17 and the lateral extending arms 26 and 27 connected therewith. When this occurs, the diaphragm B is lowered or moved toward the valve D which will open the valve D, completing a communication between the supply pipe 41 and the pipe 42 connected with the return and the pump. The reduced air condition existing in the pipe connections 40, 41 and 42 is transmitted to the diaphragm B through the agency of the flexible tube 43, and thus when this reduced air condition in the pipe connections 40, 41 and 42 is sufficient to overcome the coil springs 35 and 36 of the diaphragm B, said diaphragm will be contracted thereby closing the valve D. The pump continues to operate for a preiod after the event of the closure of the valve D and thus a deeper vacuum is created in the return than that which exists in the supply side of the system. It may be here stated that the pump continues to operate until the switch E is actuated by the operation of the diaphragm C. Upon this actuation of the diaphragm C, the pump is cut out of service which occurs after the valve D is closed. The diaphragm C is connected to the return side of the system through a pipe connection 44, the connection between the pipe 44 and the diaphragm C being completed through the medium of a flexible tube 45.

The diaphragm C is, as before stated, suspended from the arm 26 extending from the tubular member 17 and is supported through the agency of a rod 46 to which a cross piece 47 is connected, the diaphragm C being secured to the cross piece 47 through the agency of a nut 48. The opposite end of the diaphragm C carries a cross piece 49 which is connected to the diaphragm through the agency of a nut 50 and the rod 51 which has one end such as 52 threaded to allow attachment of the cross piece 49 and the nut therewith. This threaded rod 51 carries a yoke 53 and said yoke is apertured to slidably receive the threaded end of the valve stem 54. A nut 55 is applied to the threaded end of the stem 54 and said stem also carries nuts 56. The nuts 55 and 56 are spaced a suitable distance from each other to allow for a certain amount of lost motion between said nuts and the yoke 53 as it will be remembered that the reduced air condition existing in the pipe connection 11 causes the diaphragm A to be contracted and, therefore, since the diaphragm C is connected with the diaphragm A, motion is imparted to the rod 51 and the yoke 53. The valve stem 54 carries a valve 57 which cooperates with a valve seat 58. It is evident that the reduced air condition existing in the supply and return also exists in the pipe connection 44 and the flexible tubular connection 45. This reduced air condition will cause the diaphragm C to contract against the action of the coil springs 59 and 60 which are each provided with adjusting nuts such as 61 mounted upon a screw-threaded element 62 similar to those referred to in the explanation of the structure associated with the diaphragms A and B.

It is evident that when the diaphragm C contracts, the yoke 53 engages the head or nut 55 and moves the valve 57 so as to unseat it which completes a communication between the pipe connection 59' and the pipe connection 60', the latter of which is in communication with the diaphragm 61', which in turn, is connected with the switch E. Since the valve 57 is at this time open and the pipe connection 59' is connected with the pump or the supply side of the system, the reduced air condition prevailing in the supply side of the heating circuit also exists in the tube or pipe connection 60' and also in the diaphragm 61' causing the latter to be collapsed, the switch to be operated and the pump brought to a rest. It is manifest from this that as long as the required reduced air pressure exists in the tubular connections 59' and 60', the diaphragm 61' remains in a collapsed condition, this being due to the fact that the pipe connection 44 is connected with the return side of the system and therefore maintains the diaphragm C in a contracted condition which maintains the valve 57 away from its seat 58. It is further manifest that when a deviation from the required reduced air condition exists in the return side of the system or in the pipe connection 44, the pneumatic or diaphragm C will be distended, this distention being assisted by the springs such as 59 and 60 which will move the rod 51 in a downwardly direction until the yoke engages the nut 56 which will close the valve 57 and allow atmosphere to enter the port 62' and permit the diaphragm 61' to expand which again operates the switch E to close said switch and thus cause actuation of the vacuum pump. It is further evident that when a deviation from the prescribed reduced air condition exists in the pipe connection 11 which is connected with the supply side of the system, that the pneumatic or diaphragm A is distended or moved in an upwardly direction until the end of the tubular extension 17 is limited in this movement by the stop 20 which will close the valve D so that the differential at this time existing in the return and supply sides of the system may be maintained until a sufficient reduced air condition is again created in the supply side of the system sufficient to actuate the diaphragm A to cause its contraction which again opens the valve D. This upward expansion of the pneumatic A is also transmitted to the pneumatic or diaphragm C which will open the valve 57 and allow the reduced air condition existing in the pipe connection 59' to be transmitted to the pipe or tubular connection 60' which will again collapse the pneumatic 61' and open the switch E which again stops the pump which remains at rest until the established or required differential between the supply and return side of the system is changed.

The application of structures such as shown in Figs. 5 and 6, is shown and described in my application, Serial No. 426,579, filed February 7, 1930. The structure shown in Figs. 5 and 6 has been found particularly advantageous for use in connection with systems designed to maintain different portions of a building at different temperatures depending upon requirements such as those created by wind conditions or a portion of a building which, at certain periods of the day, does not have the benefit of a particular temperature condition resulting from the heat of the sun. The structure illustrated in Fig. 5 discloses a means which is connected in circuit with each individual heating circuit of a multiple heating system. This structure may include a housing 63 having a shelf or support 64, the latter providing means for supporting a diaphragm 65, the upper end of which is closed by the member 66 having an element of a yoke 67 attached thereto which provides a connection between the element 66 and a similar element 68 of a diaphragm 69.

The diaphragm 65 has coil springs 70 and 71 associated therewith which tend to maintain the diaphragm 65 in a distended condition and may be adjusted through an adjusting mechanism such as that designated 72.

The diaphragm 69 is provided with springs 73 and 74, each of which is also provided with an adjusting mechanism 75. The element 76 which forms a closure for the lower end of the diaphragm 69 has a valve rod 77 extended therefrom which terminates in a valve 78 which cooperates with a valve seat 79. The housing of the valve 78 is connected to the return side of the heating system and also to a header connected with the pump. One connection includes a pipe section 80 which is connected with what might be termed the low side of the return of the system, the pipe connection 81 being connected with the high side of the return such as the connections forming a direct connection with said header and the vacuum pump. It is, of course, understood that only one pump is employed for all of the several systems and that the pipe connection 82 is connected with a header connected with the pump. A connection 83 is formed with the supply side of the system and a flexible tubular connection 84 is provided between the pipe section 83 and the diaphragm 65 and, therefore, when a reduced air condition exists in the supply side of the system sufficiently low to overcome the resistance of the coil springs 70 and 71, the diaphragm 65 will be contracted causing the diaphragm 69 to be distended and its associated elements including the valve 78 to be moved in a downward direction which will open said valve and complete a connection between the high and low side of the return. When the valve 78 is open, air is exhausted from the low side of the return or that connected with the pipe section 80 until the required differential exists between the supply with which the pipe section 83 is connected and the return side of the system connected with the pipe section 80. A connection 85 is provided between the low side of the return or the pipe connection 80 and the movable portion 76 of the diaphragm 69, and therefor said diaphragm 69 may contract when the required differential is reached which will again close the valve 78. This causes the required differential to exist in the supply side of the system including the pipe section 83 which will again allow the diaphragm 65 to expand assisted by the coil springs 70 and 71. This movement or expansion of the diaphragm 65 also causes the head 68 of the diaphragm 69 to be moved in synchronism with the diaphragm 65, movement thereof being assisted by the coil springs 73 and 74 which will again restore this mechanism to a position in which the valve 78 is closed.

It is evident that should a relatively high vacuum occur in the supply side of the system that this vacuum will also be caused to exist in the diaphragm 65 which collapses it, moving the diaphragm 69 downwardly with it, which again opens the valve 78 which is retained in an open condition until the required differential between the supply and return of the individual system with which the structure shown in Fig. 5 is associated is again brought to that condition for which the device is set to maintain.

The structure shown in Fig. 6 illustrates a mechanism adapted to be associated and provide a single means for serving several heating systems and controlling a single pump, the latter of which is employed to maintain the required differential between the supply and return of each of the systems. The structure illustrated contemplates the provision of a pipe connection 86 which is connected with a supply header to which the supply of each system is connected. This structure also contemplates a pipe connection such as 87 which completes a communication with the pump or preferably a header with which the pipe section 82 (Fig. 5) is also connected. The structure illustrated in Fig. 6 also contemplates the utilization of diaphragms, the diaphragms being designated 88 and 89, one of which diaphragms such as 88 is supported at one end through the agency of some stationary element such as the platform 90. The opposite end such as 91 of the diaphragm 88 is movable in a manner similar to that explained with relation to the diaphragm 65. This diaphragm has the expansion springs 92 and 93 associated therewith and also has an adjusting mechanism such as 94 and 95 for adjusting the tension of the springs 92 and 93. A flexible tubular connection 96 is formed between the pipe connection 86 and the movable portion of the diaphragm 88 and therefore, when a reduced air condition exists in the pipe connection 86 or in the supply side of the system, which is in excess of that for which the springs 92 and 93 are set to resist, the diaphragm 88 will be contracted against the action of said springs, moving the end or head 91 in a downward direction as viewed in Fig. 6. A yoke or other connection is formed between the head 91 and the head 97 of the diaphragm 89. This yoke is generally designated 98 and therefore, when the head 91 is moved in a downwardly direction, the entire diaphragm 89 is moved in a similar direction. The diaphragm 89 has a valve stem 99 extending therefrom which has a double acting valve 100 which is adapted to respectively cooperate with the valve seats 101 and 102 and, therefore, when the diaphragm 88 is caused to collapse against the action of the springs 92 and 93 by virtue of an excess of reduced air pressure existing in the supply side of the system, the valve 100 is moved away from the seat 101 which forms an atmospheric connection between the air passage 103 and the diaphragm 104 through the medium of a pipe connection 105 which will actuate the electric switch 106 to close it which causes operation of the pump. Actuation of the pump creates a reduced air condition in the pipe connection 87 which, it will be remembered is connected with the pump and therefore, when the desired differential in the pipe connections 86 and 87 is created, the reduced air condition existing in the pipe 87 is also caused to exist in the diaphragm 89 which is connected with the pipe section 87 through the medium of the flexible tubular connection 107 which will cause the diaphragm 89 to contract. This contraction of the diaphragm 89 actuates the valve 100 to close the atmospheric connection 103 and to open a connection formed by the pipe 105 and the pipe 108 so as to permit the reduced air condition existing in the pipe section 87 to cause the collapse of the diaphragm 104 which will again actuate the switch 106 to bring the pump to a rest. It is manifest that should the differential existing in the return side of the system or the connection with a pump be reduced below that for which the device is set to maintain, the diaphragm 89 will again be expanded which will open the atmospheric connection 103 and cause the diaphragm 104 to expand to again close the switch 106 and actuate the pump. It is further evident that when the desired differential exists in the pipe connection 86, the diaphragm 88 will expand assisted by the springs 92 and 93 which will close the atmospheric connection 103 and again open the switch 106 which brings the pump to a rest.

The diaphragm 89 is provided with compression springs 109 and 110 and with adjusting mechanisms such as 111 and 112 which includes the screw-threaded elements 114 and 115, each of which is provided with an enlargement or a head such as that designated 116 which provide stops to limit the contraction of the diaphragm such as 89. It may be here stated that the diaphragm 88 is provided with a structure similar to that described in connection with the diaphragm 89 to limit the contraction thereof. It is manifest that the coil springs such as 92 and 93 of the diaphragm 88 and the coil springs 109 and 110 of the diaphragm 89 may be manipulated so that a great range of adjustment may be accomplished, and therefore, various degrees of differential between the supply and return of the system may be accomplished.

In Fig. 7, an arrangement is disclosed for handling a relatively large amount of air and illustrates a control device which, in some respects, is similar to the structure shown in Fig. 6, however, differs therefrom in that it is provided with a means for actuating a valve interposed between the return side of the system and the pump. The return in this structure is designated 117. The header 118 is connected with the pump and this header and return are connected with each other through the medium of pipe fittings 119 which provide a communication between the return 117 and the header 118. A valve generally designated 120 is interposed in the pipe connection 119 and this valve is controlled through the agency of a diaphragm 121 having a pipe 122 extending therefrom. The pipe 122 has one end connected with a valve generally designated 123.

A pipe connection 124 is connected with the branch such as 125 of the return side of the system and this pipe 124 is connected with the valve 123 by means of the pipe connection 126. The means for controlling the valve 123 includes diaphragms 127 and 128, the latter of which is connected with the supply side of the line 129 through the medium of a flexible tubular connection 130. When the desired differential obtains in the supply 129 and the return 117, the valve generally designated 123 is positioned so that communication between the return and the diaphragm 121 is accomplished through the pipe connection 122. It may be here stated that the valve 123 is of a double acting character and is provided to control an atmospheric connection 131 and a communication between the pipe sections 126 and 122. When a proper differential obtains in the supply 129 and the return 117, the diaphragms 127 and 128 are in the relative position shown in Fig. 7, in which the atmospheric connection 131 is closed and the connection between the pipes 126 and 122 is open which will provide a reduced atmospheric condition in the diaphragm 121 and maintain the valve 120 in a closed condition preventing the higher reduced air condition existing in the header 118 from occurring in the return 117. It is manifest that when an increase in amount of pressure below atmospheric pressure above the prescribed differential occurs in the supply side of the system, that this condition will cause the diaphragm 128 to collapse which moves the diaphragm 127 and the valve 123 with it, opening the atmospheric connection 131 and shutting off the connection between the pipe section 126 and the pipe section 122. Atmosphere entering the connection 131 then enters the pipe 122, causing the diaphragm 121 to expand which opens the valve 120 and completes a communication between the header 118 and the return 117 which will reestablish a differential between the return 117 and the supply 129.

It will be noted that a resilient tubular connection 132 is formed between the diaphragm 127 and the pipe connection 124 and thus when the required reduced air condition exists in the return side of the system, this same reduced air condition will exist in the pipe connections 124 and 132 which will cause contraction of the diaphragm 127 which will close the atmospheric connection 131 and again form a communication between the pipe connection 126 and the pipe connection 122, the latter of which is connected with the diaphragm 121.

This reduced air condition existing in the diaphragm 121 will cause its contraction which will close the valve 120 and thus prevent subjecting the return side of the system to a further reduced air condition created by the pump connected with the header 118. It is, of course, understood that the structure for actuating the valve 123 is provided with a regulating means for regulating the tension of the springs 133 associated with the diaphragm 128 and the springs 134 associated with the diaphragm 127, which provide means which assist to maintain a prescribed differential between the supply and return. Coil springs 135 are associated with the diaphragm 121 and are provided to normally maintain the valve 120 open.

From the foregoing description of the invention, it is manifest that the structure is capable of maintaining a proper differential between the supply and return sides of a heating system and is also capable of controlling the actuation of a vacuum pump which provides means for creating the reduced air condition in the supply and return of the system. It is further evident that the structure may be manipulated to provide for adjustment so that any desired differential may be obtained and maintained in the supply and return.

Having thus described the invention, what I claim and desire to cover by Letters Patent is:

1. In a device of the character described, the combination of pressure responsive means adapted for connection with a heating fluid supply and return, said means including means operable by pressure and a pressure operable valve and a pressure operable switch providing elements of means for preserving a pressure differential between the supply and return, said valve and switch being controlled by elements supported by said second mentioned means.

2. In a device of the kind described, the combination of a plurality of pressure responsive diaphragms adapted to be respectively connected with a heating fluid supply and return, a valve and an electric switch associated with and controlled by certain of said diaphragms, one of said diaphragms providing means for actuating the diaphragms for controlling said valve and switch, and said diaphragms for controlling said valve and switch being operable with said last mentioned diaphragm under the influence of pressure.

3. In a device of the character described, the combination of pressure responsive diaphragms adapted for connection with a heating fluid supply and return, means associated with said diaphragms for effecting and preserving a pressure differential between the supply and return with a lower pressure in the return, one of said diaphragms providing means for actuating the other diaphragms, and said last mentioned diaphragms having connections whereby operation thereof may be accomplished with respect to the first mentioned diaphragm with the first mentioned diaphragm under the influence of said pressure.

4. In a device of the kind described, the combination of pressure responsive means for controlling the production and regulation of a condition of pressure in the supply and return of a heating system, said means including pressure responsive means for controlling the production and regulation of pressure, and means for actuating said pressure responsive means for controlling and regulating said pressure, said means for controlling and regulating said pressure being operable independently of said actuating means.

5. In a device of the kind described, the combination of a valve, a switch, pressure responsive means for actuating said valve and said switch, pressure responsive means for moving said pressure responsive means of said valve and switch to actuate said valve, said pressure responsive means of said valve providing means for actuating said valve independently of said second mentioned pressure responsive means and relatively to said pressure responsive means of said switch.

6. In a device of the kind described, the combination of a valve, and means for controlling a switch, pressure responsive means for actuating said valve and said controlling means for said switch, said means of said valve being operable without affecting said means of said switch.

7. In a device of the kind described, the combination of a pair of valves, one of said valves providing means for controlling pressure in a heating system, the other valve providing an element of means for controlling a switch, pressure responsive means for actuating said valves and pressure responsive means for moving said first mentioned pressure responsive means, said first mentioned pressure responsive means being operable independently of said second mentioned pressure responsive means and one of said first mentioned pressure responsive means being movable with respect to its valve.

8. In a device of the kind described, the combination of a switch and pressure responsive means for controlling operation of said switch, pressure responsive means for moving said first mentioned pressure responsive means, and means whereby said first mentioned pressure responsive means is movable with said controlling means without affecting said switch.

9. In a device of the kind described, the combination of a valve arranged between the supply and return of a heating system, pressure responsive means controlled by pressure in the supply for actuating said valve, and pressure responsive means connected with said supply for actuating said valve independently of said first mentioned pressure responsive means.

10. In a device of the kind described, the combination of a valve arranged between the supply and return of a heating system, pressure responsive means controlled by pressure in the supply for actuating said valve, and pressure responsive means connected with said supply for actuating said valve independently of said first mentioned pressure responsive means, a switch and pressure responsive means for actuating said switch, said last mentioned pressure responsive means being controlled by pressure in said return.

11. In a device of the kind described, the combination of a plurality of pressure responsive elements, one of said elements providing means for controlling a valve and the other providing means for controlling a switch, and a pressure responsive element providing a support for said first mentioned pressure responsive elements and providing means for moving said first mentioned elements.

12. In a device of the kind described, the combination of a plurality of pressure responsive elements, one of said elements providing means for controlling a valve and the other providing means for controlling a switch, a pressure responsive element providing a support for said first mentioned pressure responsive elements and providing means for moving said first mentioned elements, and means for regulating the pressure required to operate said pressure responsive elements.

13. A pressure control device adapted to be connected with the supply and return of a system containing a circulating medium under pressure, said device including a plurality of pressure responsive elements, one of said elements being connected with an element of said supply and providing means for controlling circulation of said medium from the supply to the return, another of said pressure responsive elements providing means for causing actuation of a switch, said last mentioned pressure responsive element being adapted to be connected with the return and a pressure responsive element adapted to be connected with the supply and providing a support for said aforementioned pressure responsive elements.

14. In a device of the kind described comprised of a plurality of pressure responsive elements connected with each other to provide a unit, one of said elements providing means for actuating said unit, another of said elements having a valve connected therewith which is opened upon said unitary movement of said elements to allow circulation of a fluid from a supply to a return for said fluid, a connection between said element and the supply for causing actuation of said element and said valve to be closed, another of said pressure responsive elements having a connection with the return and providing means for actuating a switch.

ROBERT H. CARSON.